United States Patent Office 3,274,254
Patented Sept. 20, 1966

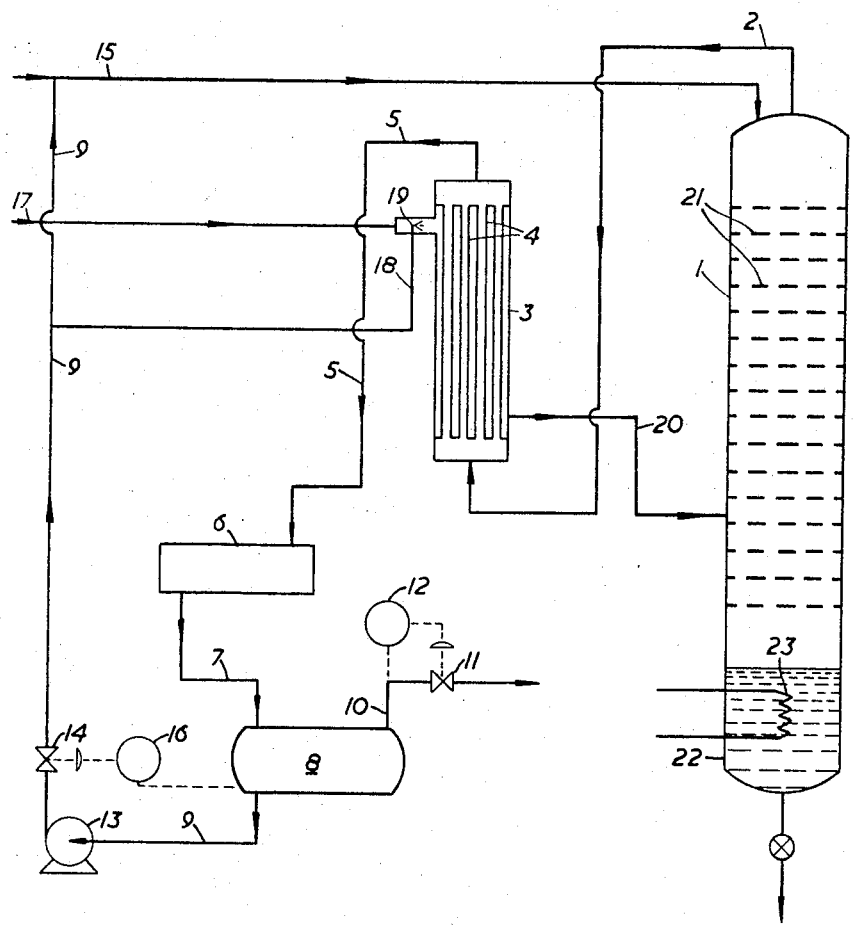

---

3,274,254
OXIDATION OF CYCLOHEXANE
William Leslie Seddon, Sale, England, assignor to Petrocarbon Developments Limited, London, England, a British company
Filed Dec. 27, 1962, Ser. No. 247,629
Claims priority, application Great Britain, Dec. 28, 1961, 46,532/61
5 Claims. (Cl. 260—586)

This invention relates to the oxidation of cyclohexane to form cyclohexanone and cyclohexanol.

It is known in the manufacture of cyclohexanone and cyclohexanol to introduce cyclohexane and air to a reactor and there under conditions of elevated temperature and pressure to oxidize cyclohexane to the desired products. For this purpose the cyclohexane must be heated in order to saturate with its vapor the incoming air at the pressure prevailing in the reactor.

Unreacted cyclohexane in the vapor phase, mixed with atmospheric nitrogen and other residual gases, is withdrawn from the reactor, separated from the waste gases and recycled. The separation is achieved by cooling the gases issuing from the reactor to a temperature at which substantially all the cyclohexane condenses out. This cooling is usually effected in a water-cooled condenser, but by this means the heat put into the gases in the reactor is rejected into cooling water.

It has now been found that at least a part of the heat content of the mixture of residual gases and unreacted cyclohexane vapor leaving the reactor can usefully be recovered by indirect heat exchange with materials being fed to the reactor. Accordingly, the present invention provides a process for the manufacture of cyclohexanol and cyclohexanone by oxidizing liquid cyclohexane with gaseous oxygen, condensing unreacted cyclohexane vapor in the residual gases leaving the reactor and returning the condensed cyclohexane to the reactor, wherein the mixture of hot residual gases and unreacted cyclohexane vapor leaving the reactor is subjected to indirect heat exchange with the oxygen-containing gas, usually air, being supplied to the reactor, and by the indirect heat exchange at least a part of the unreacted cyclohexane vapor is condensed and liquid cyclohexane is vaporized into the oxygen-containing gas.

Advantageously, the greater part of the cyclohexane vapor leaving the reactor with the residual gases is condensed by the indirect heat exchange. Any cyclohexane vapor not condensed by the heat exchange is condensed by other means before being returned to the reactor. The condensed cyclohexane may be returned in admixture with the fresh liquid cyclohexane being supplied to the reactor.

Liquid cyclohexane may be vaporized into the oxygen-containing gas by producing a suspension of particles of liquid cyclohexane in the gas, for example, by spraying the liquid into the gas and vaporizing the suspended liquid particles in the heat exchanger, the liquid cyclohexane used for this purpose may be a part of the condensed cyclohexane.

The hot vapor-containing residual gases and the oxygen-containing gas are preferably passed in counter-current to each other during the indirect heat exchange.

An example of the method of carrying out the process of the invention is described with reference to the accompanying drawing.

Hot residual gases and cyclohexane vapor are passed from the top of a reactor 1 through an outlet conduit 2 to the bottom of a heat exchanger 3 containing tubes 4 through which the hot residual gases and vapor are passed. A conduit 5 leads from the top of the heat exchanger 3 to a water-cooled condenser 6, from which the conduit 7 leads to a separator 8. The separator 8 is provided with an outlet conduit 9 for liquid cyclohexane and a gas outlet conduit 10 having a valve 11 regulated by a pressure control device 12. The cyclohexane outlet conduit 9 leads through a pump 13 and valve 14 to a conduit 15 through which fresh liquid cyclohexane is supplied to the reactor. The valve 14 is regulated by a control device 16 which is responsive to the level of the cyclohexane in the separator 8.

Air to be supplied to the reactor passes through a conduit 17 which leads to the upper part of the space surrounding the tubes 4 of the heat exchanger 3. Part of the cyclohexane passing through conduit 9 passes through a conduit 18 which leads to a spraying nozzle 19, which sprays liquid droplets of cyclohexane into the air before it enters the heat exchanger. The air containing cyclohexane vapor passes from the lower part of the heat exchanger 3 through a conduit 20 into the reactor.

The reactor 1 is a reactor of the kind used for carrying out the process described in co-pending application No. 247,628. In that process, liquid cyclohexane is oxidised with gaseous oxygen at a temperature ranging from 100–200° C. under a pressure ranging from 7–30 atmospheres absolute. The liquid cyclohexane is supplied to a reaction zone through which it passes in contact with and in countercurrent to an oxygen-containing gas, the liquid mixture of oxidation products and unreacted cyclohexane from the reaction zone is collected in a reboiler, the collected liquid mixture is concentrated in the reboiler by evaporating a part of the cyclohexane, the hot cyclohexane vapor is returned to the reaction zone and passed with the oxygen-containing gas in countercurrent to the liquid cyclohexane, and the cyclohexane vapor leaving the reaction zone with the residual gas is condensed and returned to the reaction zone so as to flow with the liquid cyclohexane supplied in countercurrent to the oxygen-containing gas.

Thus as shown in the drawing the reactor 1 contains a column of bubble trays or Raschig rings indicated diagrammatically by the numeral 21 and has the reboiler 22 at its lower end which is heated by a steam coil 23. As the hot residual gases containing cyclohexane vapor from the reactor pass through the heat exchanger 3, some of the vapor condenses in the tubes and the condensate is carried with the gases through the conduit 5 to the water-cooled condenser 6, where the condensation of the vapor is completed. Fresh liquid cyclohexane and condensed cyclohexane which has been recovered from the residual gases leaving the reactor in the manner described above, are supplied through conduit 15 to the top of the reactor so as to flow downwardly through the column 21 in countercurrent to the vapor-containing air introduced through the conduit 20 into the column.

The vapor-containing air enters the column some distance above the lower end thereof, and the oxidation is carried out in the portion of the column above the point of entry of the air in the manner described in application No. 247,628.

Instead of using a reactor of the kind described in the aforesaid application, there may be used an autoclave or series of autoclaves as in the known processes for making cyclohexanone and cyclohexanol by the oxidation of liquid cyclohexane with gaseous oxygen.

I claim:
1. A process for the manufacture of cyclohexanol and cyclohexanone by oxidising liquid cyclohexane with gaseous oxygen in a reaction zone into which liquid cyclohexane and an oxygen-containing gas are separately introduced and from which issues a mixture of hot residual gases and unreacted cyclohexane vapor, condensing the unreacted cyclohexane vapor in the residual gases leaving the reaction zone, and returning the said unreacted cyclohexane to the reaction zone, wherein liquid cyclohexane is introduced into said oxygen-containing gas before said oxygen-containing gas is supplied to said reaction zone and wherein said mixture of hot residual gases and unreacted cyclohexane vapor is subjected to indirect heat exchange with the mixture of oxygen-containing gas and cyclohexane being supplied to the reaction zone, and by the said heat exchange at least a part of the cyclohexane vapor to be condensed is condensed and liquid cyclohexane is vaporized in the oxygen-containing gas.

2. A process as claimed in claim 1, wherein the greater part of the cyclohexane vapor to be condensed is caused to condense by the heat exchange.

3. A process as claimed in claim 1, wherein a part of the unreacted liquid cyclohexane is vaporized into the oxygen-containing gas.

4. A process as claimed in claim 1, wherein the liquid cyclohexane is caused to vaporize into the oxygen-containing gas by producing a suspension of droplets of the liquid cyclohexane in the said gas and vaporising the droplets by the heat exchange.

5. A process as claimed in claim 1, wherein the hot vapor-containing residual gases and the oxygen-containing gas are passed in countercurrent to each other during the indirect heat exchange.

References Cited by the Examiner
UNITED STATES PATENTS

| | | | |
|---|---|---|---|
| 2,429,115 | 10/1947 | Atkins | 260—586 |
| 2,938,924 | 5/1960 | Simon et al. | 260—586 |

FOREIGN PATENTS

| | | |
|---|---|---|
| 878,066 | 9/1961 | Great Britain. |

LEON ZITVER, *Primary Examiner.*

LORRAINE A. WEINBERGER, M. JACOB,
*Assistant Examiners.*